(12) United States Patent
Sunkara et al.

(10) Patent No.: US 8,909,767 B2
(45) Date of Patent: Dec. 9, 2014

(54) CLOUD FEDERATION IN A CLOUD COMPUTING ENVIRONMENT

(75) Inventors: Sash Sunkara, Dublin, CA (US); Todd Matters, Royersford, PA (US); Michael Brooks, Spring City, PA (US); Chris Barry, Philadelphia, PA (US); Jason Smith, Collegeville, PA (US)

(73) Assignee: Rackware, Inc., Santa Clara, CA (US)

( * ) Notice: Subject to any disclaimer, the term of this patent is extended or adjusted under 35 U.S.C. 154(b) by 413 days.

(21) Appl. No.: 13/272,619

(22) Filed: Oct. 13, 2011

(65) Prior Publication Data

US 2012/0096149 A1 Apr. 19, 2012

Related U.S. Application Data

(60) Provisional application No. 61/392,885, filed on Oct. 13, 2010.

(51) Int. Cl.
G06F 15/173 (2006.01)
G06F 9/50 (2006.01)

(52) U.S. Cl.
CPC .................... *G06F 9/5072* (2013.01)
USPC .......................................... 709/224; 709/226

(58) Field of Classification Search
USPC .......................................... 709/217, 224, 226
See application file for complete search history.

(56) References Cited

U.S. PATENT DOCUMENTS

| | | | |
|---|---|---|---|
| 8,069,190 B2 * | 11/2011 | McColl et al. | 707/805 |
| 8,175,863 B1 * | 5/2012 | Ostermeyer et al. | 703/22 |
| 8,468,455 B2 * | 6/2013 | Jorgensen et al. | 715/733 |
| 8,505,003 B2 * | 8/2013 | Bowen | 717/168 |
| 2007/0214456 A1 * | 9/2007 | Casey et al. | 718/100 |
| 2007/0250410 A1 * | 10/2007 | Brignone et al. | 705/28 |
| 2008/0155223 A1 * | 6/2008 | Hiltgen et al. | 711/173 |
| 2009/0210527 A1 * | 8/2009 | Kawato | 709/224 |
| 2009/0222461 A1 * | 9/2009 | Alpern et al. | 707/100 |
| 2010/0110634 A1 * | 5/2010 | Woodbury et al. | 361/698 |
| 2010/0185828 A1 * | 7/2010 | Kano | 711/165 |
| 2010/0198972 A1 * | 8/2010 | Umbehocker | 709/226 |
| 2010/0235654 A1 * | 9/2010 | Malik et al. | 713/300 |
| 2011/0209064 A1 * | 8/2011 | Jorgensen et al. | 715/733 |
| 2012/0011254 A1 * | 1/2012 | Jamjoom et al. | 709/226 |

FOREIGN PATENT DOCUMENTS

| | | | |
|---|---|---|---|
| JP | 2008225546 A | * | 9/2008 |
| JP | 2009140053 A | * | 6/2009 |
| WO | WO 2010080214 A1 | * | 7/2010 |

* cited by examiner

*Primary Examiner* — Kostas Katsikis
(74) *Attorney, Agent, or Firm* — Kunzler Law Group, PC

(57) ABSTRACT

Various methods, devices, and systems are described for cloud federation in a cloud computing network including bridging computing resources between an enterprise and a cloud or among multiple clouds. These techniques involve generating an image of the host system and decoupling it from its underlying computing resources so that it can be migrated across disparate computing resources in a seamless manner. In one embodiment, an enterprise workload can be bridged with cloud resources to receive software as a service. In other embodiments, bridging is performed across multiple public or private clouds, each potentially having disparate computing resources. In addition, users can access and use these cloud services through a web browser or other network interface anywhere in the cloud computing network as if the services were installed locally on their own computer.

27 Claims, 6 Drawing Sheets

US 8,909,767 B2

CLOUD FEDERATION IN A CLOUD COMPUTING ENVIRONMENT

PRIORITY

This patent application claims priority to and incorporates by reference in its entirety the corresponding U.S. Provisional Patent Application No. 61/392,885, entitled "Methods and Apparatuses for Federating Among Multiple Clouds in a Cloud Computing Environment," filed Oct. 13, 2010.

FIELD OF THE INVENTION

At least certain embodiments of the invention relate generally to cloud computing, and more particularly to federating clouds in a cloud computing environment.

BACKGROUND

A hypervisor, also called virtual machine ("VM"), allows for the creation of a virtual computer or virtual system. It allows multiple operating systems on each VM to run concurrently on a host computer—a feature called hardware virtualization. Hypervisors present guest operating systems with a virtual platform and monitor the execution of the guest operating systems. In that way, multiple operating systems, including multiple instances of the same operating system, can share hardware resources. Historically, hypervisors provide the ability to consolidate many platforms with VMs. Because of this, several tools were developed to allow conversion between physical hardware resources and virtual hardware resources. But hypervisors experience many difficulties including cost, network issues, disparate interfaces, and performance issues. Furthermore, many applications are not developed with hypervisors in mind. It is difficult to plan which applications to consolidate onto a single hypervisor as application performance requirements vary over time.

Cloud computing is similar to the use of hypervisors, but provides an additional level of abstraction that solves many of the shortcomings of hypervisors. Cloud computing essentially virtualizes across multiple virtual resources. Cloud computing is Internet-based computing where shared computing hardware resources, software, and information are provided to computers and other devices on demand, like an electrical power grid. Cloud computing describes a new consumption and delivery model for IT services involving over-the-Internet provision of resources that provides a layer of abstraction between users and the particular computer hardware being used. Cloud computing infrastructure services deliver computer infrastructure as a service. As such, users no longer need expertise in, or control over, the technology infrastructure that supports them. Rather than purchasing servers, software, data center storage space or network equipment, users can instead purchase those resources as a fully outsourced service on an on-demand basis. Cloud application services, referred to as "Software as a Service" (SaaS), deliver software over the Internet as a service, thus eliminating the need to install and run the application on a user's own systems. The service is typically billed on a utility computing basis based on the amount of resources consumed, where the costs generally reflect the level of activity or usage. Sharing computing resources among multiple organizations or users can improve utilization rates, since servers are not unnecessarily left idle for any extended period of time. This reduces costs significantly and can increase the speed of application development. A side-effect of this approach is that overall computer usage rises dramatically as users no longer have to engineer for peak load limits. In addition, increased high-speed bandwidth makes it possible to receive the same response times from centralized infrastructures at other sites.

Cloud computing frequently takes the form of web-based tools or applications that users can access and use through a web browser as if it were a program installed locally on their own computer. Typical cloud computing service providers deliver common business applications online that are accessed from another web service or software such as a web browser, while the software and data are stored remotely on the servers of the cloud computing service providers or "cloud service providers." One element of cloud computing is customization and the creation of a user-defined experience. Most cloud computing infrastructures consist of services delivered through common centers and built on servers. Clouds often appear as single points of access for all computing needs. Commercial offerings are generally expected to meet quality of service requirements, and typically include service level agreements. FIG. 1 depicts an example block diagram of a cloud computing environment. In the illustrated embodiment, various local user cloud client computers 102 are interconnected to one another through the exemplary cloud service providers 101 within an example cloud 100. Some major cloud service providers include Microsoft, Salesforce.com, HP, IBM, Amazon, and Google. A cloud client 102 consists of computer hardware or software that relies on cloud computing for application delivery, or that is specifically designed for delivery of cloud services.

A "public cloud" is defined as computing resources that are dynamically provisioned on a self-service basis over the Internet, via web applications or web services, from an off-site third-party cloud service provider who bills its clients on a utility computing basis, much like electricity usage is billed to public utilities customers. A private cloud, on the other hand, is a shared infrastructure that may be established within an enterprise having various departments with similar requirements. Cloud computing requires storage of massive volumes of data called "cloud storage," which is a model of networked computer data storage for storing data on multiple virtual servers, generally hosted by third parties, rather than being hosted on dedicated servers. The data center operators "virtualize" resources according to the requirements of their customers and expose them as virtual servers, which the customers can themselves manage. Physically, the resource may span across multiple servers or storage systems.

Cloud computing allows for dynamic placement of workload on dedicated or consolidated servers based on user-defined policies. Because of increased workloads, enterprises have to do a lot of capacity planning upfront to account for peak periods of activity, while at other times, resources may go underutilized. Cloud computing provides a way to avoid this problem of requiring such upfront capacity planning by using cloud resources, which essentially pushes the capacity planning to the cloud computing service providers. From a cloud service provider point of view, having multiple enterprises with differing peak capacity requirements allows for greater capacity planning and optimization because usage among disparate customers is generally amortized over time. The average of capacity peaks over many different enterprises in many cases only requires a finite number of resources. A pay-as-you-go solution that offers compute on demand is a good complement to dedicated and consolidated infrastructure (e.g., hypervisor) in the enterprise. Enterprises currently employ any combination of physical hardware and virtual hardware (e.g., hypervisors or VMs) resources to accomplish computing tasks or workloads.

SUMMARY

Various methods, devices, and systems are described for cloud federation in a cloud computing network including bridging computing resources between an enterprise and a cloud or among multiple clouds. These techniques involve generating an image of the host system and decoupling it from its underlying computing resources so that it can be migrated across disparate computing resources in a seamless manner. In one embodiment, an enterprise workload can be bridged with cloud resources to receive software as a service. In other embodiments, bridging is performed across multiple public or private clouds, each potentially having disparate computing resources. In addition, users can access and use these cloud services through a web browser or other network interface anywhere in the cloud computing network as if the services were installed locally on their own computer.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Figure 1:
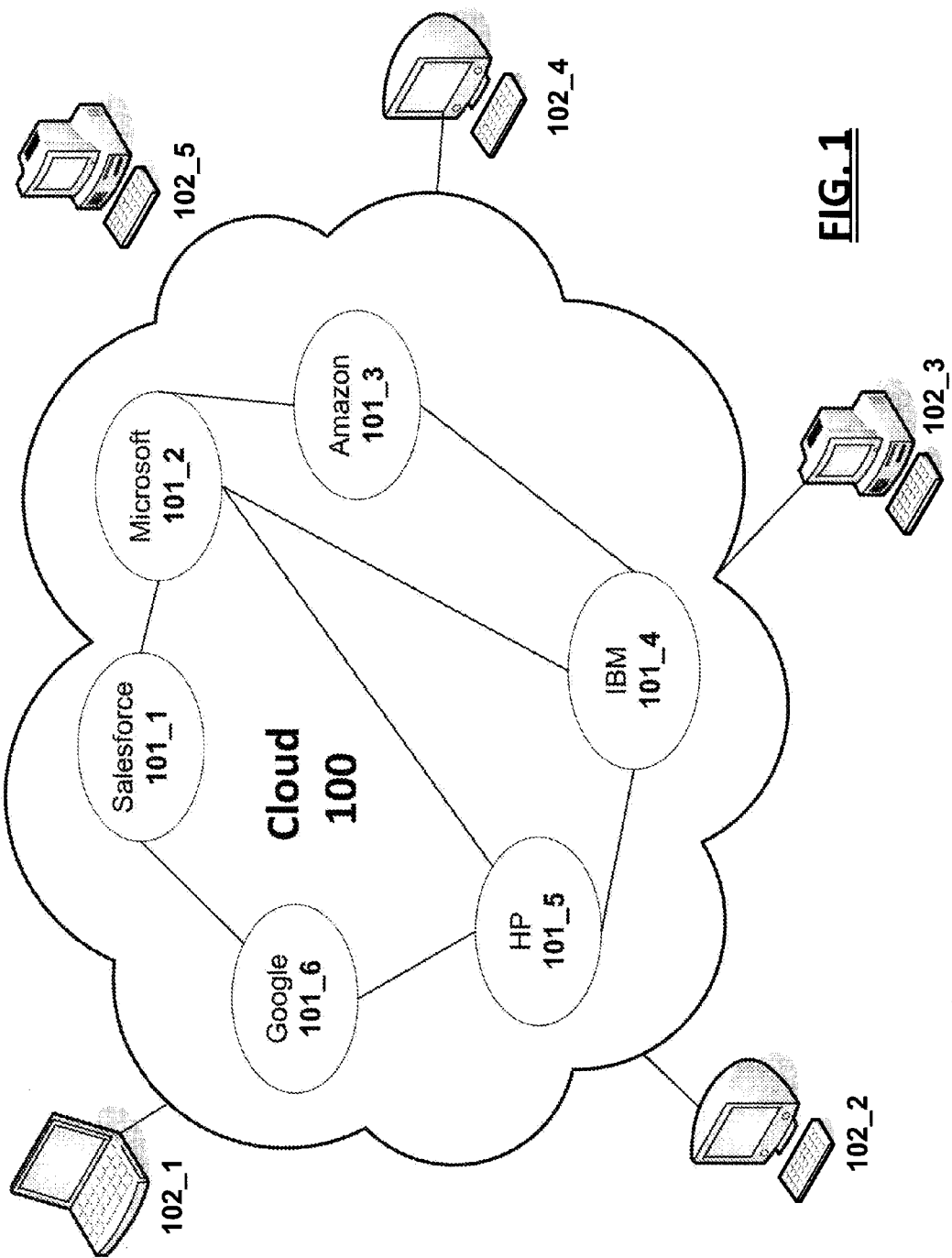
FIG. 1 depicts an example block diagram of a cloud computing environment.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

Various methods, devices, and systems are disclosed for federating among clouds in a cloud computing environment. Cloud federation essentially includes bridging computing resources of an enterprise across computing resources in a cloud computing environment. Methods and apparatuses are described for bridging enterprise systems with one or more public or private clouds, and to federate among a plurality of clouds in a cloud computing environment. An enterprise may consist of a company, association, organization, or other group of computing resources. An enterprise may contain one or more data centers, and may include a private cloud to integrate each of the data centers within the enterprise.

The techniques introduced herein are operable to federate among clouds and enterprises having a vast array of disparate computing resources. In many cases, the computing resources of one cloud may be different from another cloud. The computing resources may also be disparate from one another within any particular cloud or enterprise. For example, the techniques introduced herein can be used to bridge seamlessly between an enterprise where computing tasks are built on an IBM platform having a set of IBM servers and a cloud built on a Dell platform having a set of Dell servers, or any combination of these, as well as other disparate types, makes, or models of computing resources. In addition, at least certain embodiments disclose federating among multiple clouds in a cloud computing environment, as well as bridging between one or more clouds and an enterprise or multiple enterprises. There can be substantial overlap between the cloud resources and the resources of the enterprise, or other clouds. Each enterprise may have some or all of its computing resources in a cloud or multiple clouds. In addition, embodiments include bridging between public and private clouds, as well as overlapping public or private clouds.

Each single cloud in a cloud computing environment has finite resources; so, if a particular cloud saturates the computational and storage resources of its virtualization infrastructure, it may not be able to satisfy further requests for service allocations. By bridging and managing resources among multiple clouds, hardware computational and storage resources can be managed and optimized across any number of systems or enterprises. This introduces new business opportunities among cloud providers, but also raises many challenges such as cloud federation, security, interoperability, QoS, monitoring, and billing. Users can access and use these cloud services through a web browser or other network interface as if the services were a program installed locally on their own computer.

Figure 2:
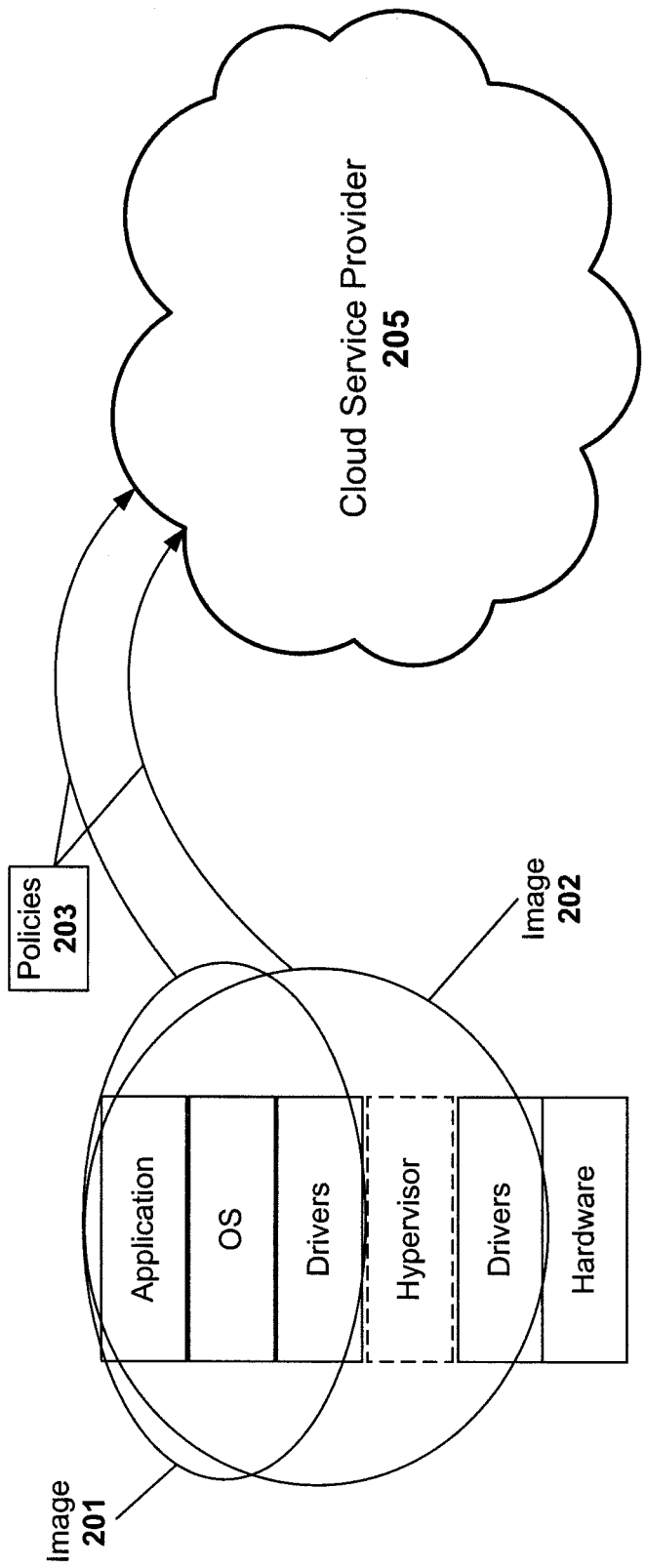
FIG. 2 depicts an example block diagram of decoupling a workload (image) from its associated hardware system and placing it into a cloud.

To do this, workloads can be decoupled from the underlying hardware and placed in one or more clouds for processing. One technique by which workloads can be decoupled from the underlying system is to define a workload as an "image" (as shown in FIG. 2). An "image" as defined herein includes an operating system ("OS"), and optionally its overlying application stack, but that has no network identity such as a virtual MAC address or an IP Address. An image may have one or more unique identifiers—image name, or UUID. An Image optionally includes one or more network identifiers such as a virtual MAC address (e.g., in the context of an Ethernet Network) or an IP address. The term "host image" can be used interchangeably with image. A host image may also have an image name or UUID. A "cloud image" includes an operating system and optionally its overlying application stack, but is an image that has been uploaded into a cloud storage. The storage path to the location where the image is located in the cloud is used to identify the cloud image.

A "system" as used herein is defined as any generic hardware platform (virtual or real) capable of running an image. A system may consist of characteristics such as CPU, memory and other peripherals. A system can be a bare metal server or a VM that exposes the same attributes as a bare metal server. As examples, a system can be identified by one of the MAC addresses of its network card or the address of its service processor. A system also can have a UID. A "host" as defined herein is any network addressable entity that is comprised of a host image running on a system within the enterprise. A host can be identified by an IP Address, host name DNS host name, or UID. A "cloud host" is a network addressable entity that is comprised of a cloud image running on a system in the cloud. The system in the cloud can be provisioned by the user at boot time. A cloud host can be identified using the path to its location in the cloud including by a DNS name or an IP address.

FIG. 2 depicts decoupling a workload (image) from its associated hardware system and placing it into a cloud of a particular cloud service provider. This can be accomplished by decoupling the images 201 and 202 from their underlying computing resources such that each image can be placed onto any of a multiplicity of platforms in a seamless manner, whether the platforms be other physical hardware systems (e.g. those having additional bandwidth), hypervisors, or various cloud service providers' platforms 205 as depicted in the illustrated embodiment. In addition, the source and destination computing resources may all be contained within an enterprise having one or more data centers within a private cloud such that data is migrated from data center to data center within the enterprise in a seamless manner. One of the core functions of the techniques described herein is the ability to configure an image to add new capabilities such as network resources, file-system resources, and driver resources that are available to it, prior to migrating the image. The image can be configured when assigned or unassigned to a system. The metadata is also updated as part of the configuration process. This feature offers the users a powerful toolset wherein images can be dynamically managed and provisioned based on system requirements.

As shown in FIG. 2, an image 201 can be defined to include an operating system and its associated application stack, as well as any associated drivers stacked on top of the underlying hardware. An image may also be defined to include one or more hypervisors and associated drivers as shown for image 202. An image can be defined and decoupled from its underlying hardware, and placed onto any other platform, including other physical systems or hypervisors, or into a public or private cloud for efficient use of processing resources. Not only can the image be separated from the underlying hardware, but the image bits can also be separated from the metadata about the image to enable broad image mobility functions among computing resources in a cloud computing environment.

An image can be cloned before, or after, it is decoupled from its system and placed into one or more clouds, and the techniques introduced herein provide several options for synchronization between the image running in the cloud and its clone stored locally. In addition, one or more policies 203 may also be uniquely defined for each image placed in the cloud as shown in FIG. 2. These policies can be tied to various metrics that are important to the business of the customer of the cloud provider. The policies can be, for example, based on time of day, utilization rates, etc. Images can be migrated between physical machines, physical and virtual machines or hypervisors, physical machines and the cloud, virtual machines and the cloud, or any combination of these. The techniques described herein can also facilitate building private clouds for an enterprise itself to optimize resources across its departments such as engineering, finance, legal, etc. These departments can then share resources within a private cloud. In addition, once the private cloud is built, it can be bridged to one or more public clouds, or other private clouds using various embodiments described herein. A private cloud can also be presented to outside organizations as a public cloud, allowing external organizations to lease bandwidth from the enterprise.

Cloud service providers may be configured differently and can be incompatible with one another. There can also be issues with credentials management since different service providers may have different authentication schemes, etc. Without the techniques disclosed herein, enterprises would have to create different software to interface with different cloud service providers. But this can be avoided by providing a single point of interface with multiple processing resources, regardless of whether the resources are distributed among multiple clouds, or physical or virtual processing resources within the enterprise itself; or within one or more private clouds. Cloud Federation essentially allows for bridging these physical and virtual resources with one or more public or private clouds in a seamless integration. Thus, a user can be unconcerned about the location of the user's computing workload because the only issue of any relevance is that the workload runs economic and efficiently. The cloud service providers can migrate workloads internally based on usage between, for example, small, large, and virtual machines running within the cloud or among multiple clouds. This allows the cloud service provider to offer tiered pricing and automatic policy migration between different systems.

Figure 3:
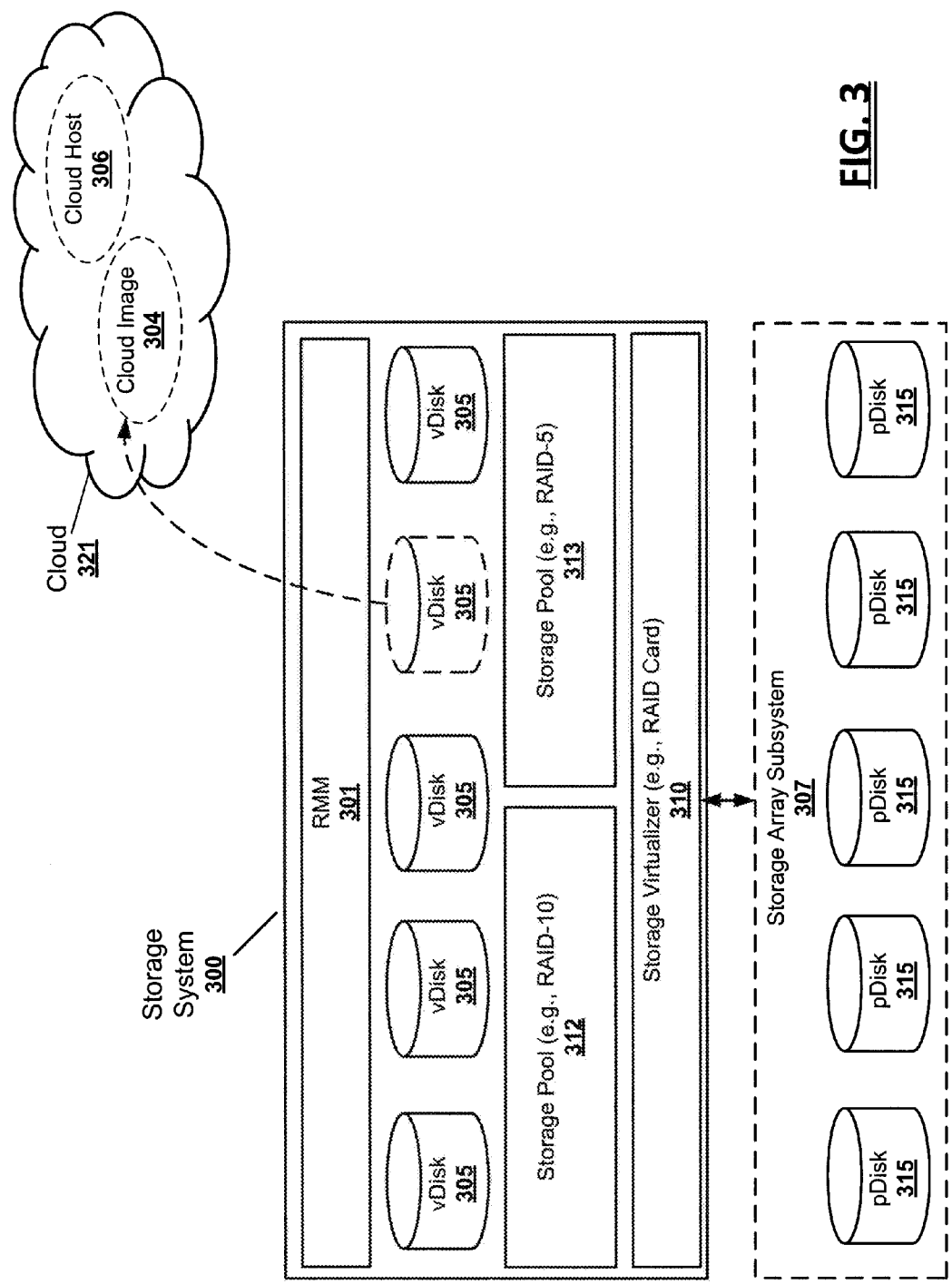
FIG. 3 depicts an example embodiment of a system for bridging computing resources in a cloud computing network.

FIG. 3 depicts an example embodiment of a system for bridging computing resources in a cloud computing network. In the illustrated embodiment, storage system 300 includes a remote management module ("RMM") 301 coupled with a number of virtual disks ("vDisks") 305 in a storage array. In one embodiment, the RMM can include a Rackware Management Module having migration capabilities across physical, virtual, and cloud platforms developed by Rackware, Inc., Fremont, Calif. vDisks 305 each include a virtual disk of a certain capacity that is carved from one of storage pools 312 or 313. For example, vDisks 305 could be a 40 GB virtual disk created out of a RAID-5 storage pool 313 that has a total capacity of 400 GB. This means that the RAID-5 storage pool would have 360 GB left over which to create the other vDisks 305 in the pool. Each storage pool 312 and 313 comprises a storage virtualizer 310 in conjunction with physical disks ("pDisks") 315 that are present in the storage array subsystem 307. A storage pool 312 and 313 can have the attributes of RAID levels, as well as capacity and other access right policies that are enumerated and maintained by RMM 301. Each pDisk is a physical storage medium that is present in the storage array and can include any nonvolatile hardware storage resources such as conventional magnetic or optical disks, a SAS Drive, a SATA, flash or other solid state memory, or any combination of such devices. The RMM can group these pDisks as resources for a particular storage pool such as a RAID-10 Pool, RAID-5 pool, etc. as discussed above. A storage virtualizer 310 is typically a hardware acceleration device such as a RAID Card. The RAID Card is the main entity through which the storage pools are created out of the pDisks.

Figure 4:
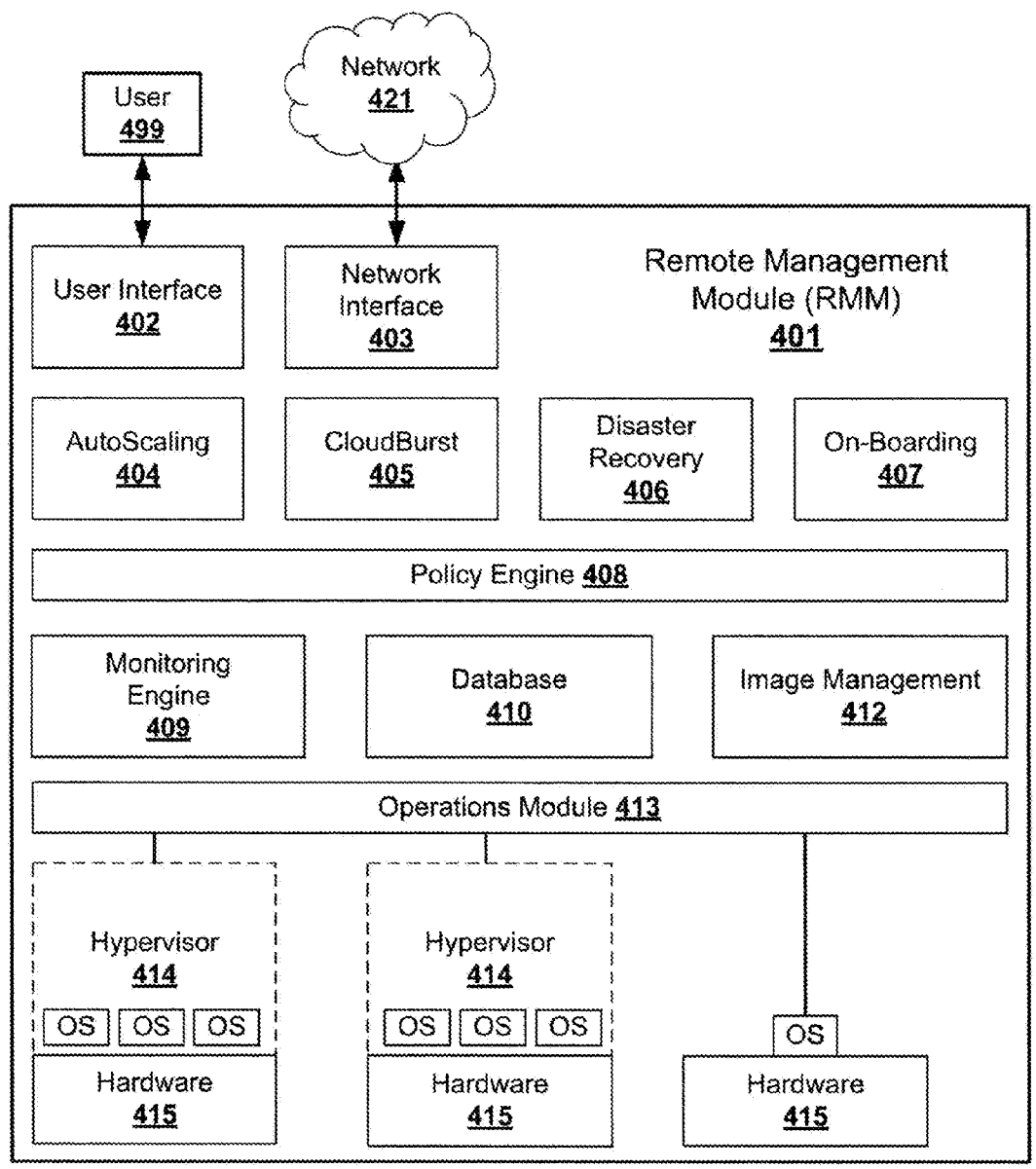
FIG. 4 depicts an example block diagram of an embodiment of a remote management module.

FIG. 4 depicts an example block diagram of an embodiment of a remote management module. In the illustrated embodiment, RMM 401 includes a user interface 402 for access by users 499. Embodiments of user interface may include a command line interface ("CLI") or an application programming interface ("API"). RMM 401 also includes a network interface 403 for connecting to network 421. The RMM 401 further includes an autoscaling module 404, a cloudburst module 405, the disaster recovery modules 406, on-boarding module 407, policy engine 408, monitoring engine 409, database 410, image management module 412, and operations module 413 coupled with hardware resources 415 through various hypervisors 414 and operating systems OS.

Base Functionality

In at least certain embodiments, the base functionality of the RMM 401 consists of "discover," "capture" and "migrate" operations that function on the host or image using operations module 413. Another basic function that is provided by the RMM is the "system add" function wherein physical or virtual systems are brought under the management of the RMM. Other functionality that the RMM provides is created on top of these basic functions. The operations module performs the discover, capture and migrate functions and is configured to access hardware resources 415 though the various hypervisors 414 and operating systems OS.

An image is the set of image bits and image metadata. The capture function is used to bring the host under the management of the RMM by separating the metadata of the image from the actual image bits. That is, not only can the image be separated from the underlying hardware 415, but also the image bits can be separated from the metadata about the image. The image bits include the software in executable binary form of the operating system, applications, device drivers, configuration files and information, and optionally application data. The image metadata includes information not part of the image bits, but required for the image to be identified and configured on hardware for operations. Metadata can include any of a unique identifier, a label or name, network configuration information, file system structure, architecture, operating system type and version, virtual MAC addresses for each network interface, applications and application configuration information.

Discover Hosts

The discover function is used to create and add a host to RMM 401. The discover process can be employed to identify the host and systems that are present in the environment. The discover process by itself does not bring the host under the management of RMM 401. As mentioned earlier, hosts are images that are running on systems. The host to be discovered can be identified by means of an IP address or a DNS hostname. RMM 401 is also capable of adding hosts that are within a specified range of an IP subnet. The discover host process may be invoked by use of user interface 402 CLI or API to instruct the RMM 401 to be able to determine information about the host. The RMM 401creates a host, system, and image, and assigns, in certain embodiments, a "friendly name" to the host. This allows the user to use the friendly name instead of the IP address in the context of RMM 401.

Once the discover command is executed, the RMM 401 executes various commands to obtain the information of the host operating system and the underlying system. This information is collected by the RMM 401 and cataloged in a database 410 for each host created. In one embodiment, the database is referred to as a configuration management database ("CMDB"). The information can include the following items: CPU type; chipset type; amount of memory; operating system type; operating system version; number of NIC cards; MAC addresses of each NIC port; etc. In addition, database 410 does not need to be located on RMM 401 as database 410 can be located anywhere within network 421 where the RMM 401 has network connectivity. Discover operations can be initiated via the use of a user interface 402 CLI or API.

Capture Hosts

In at least certain embodiments, the capture process is employed to bring a discovered host and system under the management of the RMM 401. The capture process prepares the image to enable it to be migrated across heterogeneous physical and virtual systems. One of the steps in this process is to be able to configure the image to be able to boot and run on multiple CPU platforms such as Intel Xeon family and AMD Opteron family of processors, or between virtual CPUs presented by various hypervisors. At least certain embodiments are configured to decouple the image from its underlying set of computing resources 415. This process can include, but is not limited to, analyzing and discovering the image metadata, configuring the image to optionally run multiple device drivers, assign virtual MAC addresses to network interfaces, and making available an algorithm whereby network connectivity is discovered and dynamically configured. Optionally, the image bits can be moved to other storage locations. Once a host has been captured, the host can then be migrated to other systems that are managed by RMM 401. In addition to the above functionality, images can be cloned and configured, and subsequently assigned to systems to create various hosts. As a corollary, images can be unassigned from hosts to disassociate the image from its underlying system. The rest of this section describes each of these basic functions in greater detail. Capture can also be initiated via the use of user interface 402 CLI or API.

Migrate

After the capture process is complete, the host is ready to be migrated from one system to another over network connection 421. The host can either be powered on or powered off during the migration. The source system can be physical or virtual system. Similarly the target system can be a physical or a virtual system. The process of migration can happen in two ways. The first way is a process where the source system is shut down and booted up again on the target system. The second way to perform a migrate operation is a process where the source system is migrated "live" to a target system without the need for a underlying hypervisor. This can be done by taking a snapshot of the live system, and performing a clone operation on the snapshot without disturbing the operation of the live system.

Following the migrate command, the host as described by the host identifier (IP Address or DNS hostname) moves from its existing system to the target system. Once the migrate is successful, the system where the host was originally running on becomes a "spare" system in the system pool. Migrate operations can be initiated via the user interface 402 CLI or API.

Cloudify

The process by which existing OS images and associated application stacks are prepared to be able to run in the cloud is called "cloudify." The remote management module makes it possible for an OS image to be cloudified for various cloud service providers in an uniform manner. The advantage of this approach is that the OS image that is qualified and approved by the enterprise is available to it in the cloud. Furthermore, any security patches or application dependent upgrades that are performed in the enterprise can be replicated in the cloud without having to worry about image consistency and interoperability issues. By providing a consistent user interface and a platform that enables the user to simply specify the cloud service provider, the remote management module is able to abstract the underlying cloud service provider-specific API complexities.

Image Clone and Synchronization

For various reasons, it may be desirable to maintain a replica of the data set of the source storage system. For example, in the event of a power failure or other system crash, data lost at the source storage system can be recovered from the replica stored in the destination storage system. An image can be cloned to create a new image. This new image is an identical copy of the original, albeit with a new virtual MAC Address. This newly created image is now an independent entity that can be managed. An important element of the techniques described herein is to allow a cloned image to remain synchronized with its corresponding primary image, so that when configuration changes or updates to datasets are made, those changes can be propagated to the cloned images. In this way, changes to the primary image can be applied to the cloned image to help in cases of disaster recovery and for scaling operations (discussed below). For example, changes in the primary image can include operating system updates, new installations of applications or configuration changes in existing applications, and updates to the dataset of the image, etc.

Various methods and techniques described herein allow for synchronization using mechanisms that are non-disruptive to the primary image. To do so, the remote management module needs to be updated with the changes to the data set of the source storage system since a previous replication operation was performed to make sure all changes are replicated at the destination storage system. The remote manager module does this by comparing the most recent snapshot of the data set of the source storage system to the snapshot of a previous replication operation to determine differences. The remote management module identifies any data that has been added or modified since the previous snapshot operation, and sends those additions, deletions or modifications to the destination.

Cloud Bursting

In the illustrated embodiment of FIG. 4, RMM 401 includes a cloudburst module 405. Cloud bursting is built on top of the fundamental cloud capabilities described above. While cloudify defines how images are pushed into the cloud, cloud bursting provides an automated method of instantiating cloud hosts based on computing needs in the data center. The enterprise can burst automatically into the public or private cloud for additional capacity during peak periods. Cloud bursting 405 utilizes the autoscaling module 404 in combination with the monitoring engine 409. The hosts are monitored for activity, and upon user defined triggers (RMM 401's internal triggers or external triggers), additional cloned cloud hosts are launched as needed. As resource requirements decrease, the cloned cloud hosts are deactivated and left in a "parked" state. The data generated can also be copied back to the enterprise (copy back feature). Another important aspect of cloud bursting is the ability to set policies that place a preference on which computing resources to be utilized first. For example, an enterprise may wish to utilize their own computing resources to meet additional demand through cloud bursting before sending anything out to the cloud. Once these local resources have been exhausted, then the cloud resources can be utilized. But this is given by way of illustration and not limitation as any number of different policies can be used for a myriad of reasons to favor a particular set of computing resources during cloud bursting. The cloud bursting process is automated to easily leverage the cloud for additional on-demand capacity as needed or desired.

Monitoring

The RMM 401's internal triggers work with a host monitoring engine 409. Monitoring defines several parameters for taking statistics and averaging those over time. The measured threshold for the trigger is based on a configured interval. Embodiments may also perform monitoring of usage levels of the host. The monitoring can be done for various reasons including for managing bandwidth during times of peak utilization. In one embodiment, the monitoring engine 409 is integrated with the policy engine 408. There are numerous configurable parameters that can be specified to influence the monitoring behavior of the system such as frequency of sampling, operational statistics categories (such as CPU utilization, network bandwidth, memory utilization, etc.), as well as historical record keeping. Moreover, there are distinct parameters that define an interval that permits a number of monitoring snapshots to be averaged and recorded. These intervals permit for samples to be averaged over time to better make policy decisions, allowing for efficient data recordation and triggering policies. The policy engine 408 and monitoring engine 409 are instrumental in decision making about higher level functions, such as autoscaling.

Policy Engine

This section discusses the policy engine 408 of RMM 401. The policy engine 408 is used to set various policies for managing the hosts, systems, images, etc. Policies are rules that associate the hosts and images with certain attributes and actions. Policies may be set so a user can configure them based on the needs of the enterprise. Policies can be broadly classified into asynchronous and synchronous policies. "Events" are a set of defined conditions that the hosts and images can be monitored for. In response to events certain defined "actions" are taken.

Autoscaling

RMM further includes an autoscaling module 404. Autoscaling provides dynamic, automatic scaling of host images for private or public cloud environments. Groups of hosts can be defined with operational parameters that influence when hosts are powered on and off to meet computing demands as they ebb and flow. A first step is to capture the host(s) used as the basis for autoscaling. Once that host is captured, any number of cloned images can be generated that are exact duplicates of the original, most importantly in terms of application installation and configuration. The cloned and original images differ in that the cloned images will be described by different metadata, such as each clone will have a different network location and identifier. Each clone can be configured with its unique network configuration (e.g., IP addresses), and assigned to a system. Typically, the system it is assigned to will be a VM, but any VM or bare metal system is acceptable. Scaling up of the hosts can be triggered by metrics gathered internal to the RMM, i.e. using monitoring engine 409 to monitor resource utilization, performance, etc., or by external triggers such as a load balancer. During the scale-up process, cloned images are assigned to their respective systems (bare-metal or virtual machines). These images can continue to be stored in remote storage, or moved to local disk of the system. Once the load or traffic decreases, the scaling down process can be triggered such that the excess instances are powered off and go back to a "parked" state.

Autoscaling has a number of unique features that provide capabilities beyond simply scaling compute resources. The number of hosts can be bound by a minimum and maximum. When specifying the maximum number of hosts, autoscaling will scale the number of hosts specified by a "max" parameter, regardless of the number of hosts in the group. This value can be used to cap resources applied to the group. Setting the minimum number of hosts ensures a specific level of applicable resources regardless of the trigger status. Setting a minimum value also has the advantage of built-in failover. In addition to scaling, the RMM 401 monitors for failure conditions, and in the event of a failure, another host can be instantiated to maintain the specified minimum number of resources defined for a group. Great flexibility is also provided by using these triggers. Triggers can be set based on metrics gathered via RMM 401 monitoring or generated externally via administrator defined algorithms.

The internal triggers can work with the monitoring engine of the remote management module. In one embodiment, the measured threshold for the trigger can be based on the configured interval. When that value reaches a threshold for all hosts, the appropriate action is taken (powering on or off). Another feature of autoscaling based on triggers is how many hosts to power on/off for a specific trigger. Various factors can be set to define the number of hosts to power on/off for a given trigger event. As hosts are powered on and off, it may be important to coordinate with other infrastructure, such as a load balancing engine.

Disaster Recovery Operations

The RMM 401 supports an easy to use, economical, disaster recovery module feature. Disaster recovery module 406 utilizes image refresh, synchronization, and image capture operations. A policy can be defined to begin disaster recovery operations based on some trigger. A virtual appliance (or other firewall appliance) can be packaged within each container to enhance functionality. Instead of communicating with the cloud directly, an enterprise can communicate with the virtual appliance, that in turn communicates with the cloud using secure, trusted proprietary communications. Captured images can be cloned and pushed out to a disaster recovery site (a private or public cloud environment or remote data center). At that site, periodic updates are synchronized with the remote image keeping the original host image and the disaster recovery image in synchronization. In the event of an outage at the origin site, the up-to-date image at the disaster recovery site can assume operations.

This provides significantly improved disaster recovery support that is a small fraction of keeping a replicated datacenter. Setting up a disaster recovery image utilizes the basic fundamentals of RMM 401, beginning with capturing the primary host. Then a clone of the image can be made, cloudified, and deployed at the desired cloud location. The resulting cloud image is left in "parked" state and is launched following a disaster at the primary data center. The primary host image can reside in remote storage (at the primary site) or on the local disk. If the host image resides on the local disk, the RMM can be configured to take periodic snapshots of the image. If the image resides remotely, a snapshot operation will already have been executed on the host image via the storage array management interface. In the background, any changes in the image with the image at the disaster recovery site are synchronized with the primary image. In the event of a disaster recovery event, the cloud image is launched and is running with the latest synchronized changes.

It is important that image updates include user data, operating system updates, and application installations and configuration changes. The disaster recovery module 406 supports all of these. While OS updates are more infrequent, it is still important to ensure that patches are kept in synchronization with the disaster recovery image. When updating the OS, an image refresh operation is done from the RMM 401 first before the synchronization to the cloud image. After a disaster recovery event, it is easy to restore the primary site with any recent changes made to the cloud image. When the primary site is restored to its operational state, the administrator can capture the image from the cloud to refresh the original image.

Onboarding

RMM also includes an on-boarding module 407. Images may be "pulled" by a service provider from an enterprise or "pushed" by the client to the service provider, in both cases over a secure connection. This pulling technique is referred to as "onboarding" and is corollary of an image being "pushed" from within an enterprise to the cloud service provider. Onboarding may be used by a public cloud provider or service provider to discover, capture, and migrate workloads from physical, virtual, or cloud computers of the enterprise to the cloud provider or service provider. Onboarding has another mechanism where an apparatus can be installed at the client site via a portable storage device, and the onboarding operation is performed to the device, thereby eliminating the requirement for an external network connection.

Containers

Images typically do not run by themselves. Instead, they usually interact in a three-tier model running as part of the enterprise workload that includes: (1) a web tier; (2) an application tier; and (3) a database tier. For example, a web tier may present web pages to the user. The user interacts with the web pages that utilize the application tier. Then, once the user is ready to make a transaction, it will get recorded in the database tier. In addition, when an image is placed in the cloud, something called a "container" can be used to bundle these tiers as needed for the task to be accomplished. A container is a fully described a set of images and their relationships to each other. When performance operations they can be applied to the entire container or to individual elements of the container. For example, a container may be used for a particular task requiring two web tiers, three application tiers, and a database tier. These can all be combined together into a container to perform the desired functionality.

Also a policy or group of policies can be associated with each container, just as they can be for individual images. When a container is defined, it can be placed into the cloud to perform the desired functionality, and the results can be tied back to the enterprise using a secure communications medium, such as, for example, a Virtual Private Networks ("VPNs"). Any secured communications medium can be used without departing from the principles underlying the various embodiments. Communications between customers and a particular cloud can be accomplished by message passing across one or more secure communication mediums. Additionally, a container can be split up across multiple service providers. As such, a container can span multiple clouds, which can be integrated together using one or more secure communications mediums.

Figure 5:
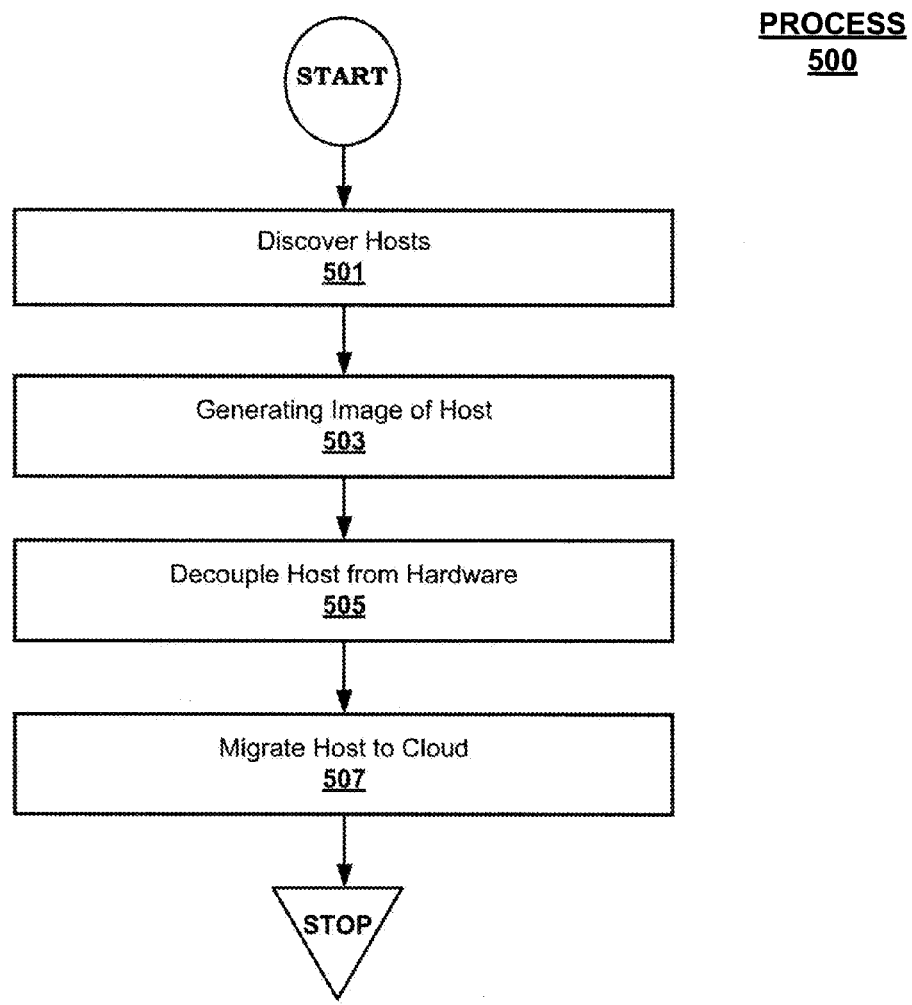
FIG. 5 depicts an example of a process for bridging computing resources in a cloud computing network.

FIG. 5 depicts an example of a process for bridging computing resources in a cloud computing network. In the illustrated embodiment, process 500 begins at operation 501 by discovering one or more hosts to begin the bridging process. The discovered hosts may be added to a list in the CMDB in one embodiment. Process 500 continues with operation 503 where an image is generated of the discovered host(s). In one embodiment, an image is generated by performing a snapshot of the host system. The image is then decoupled from its underlying hardware computing resources (operation 505) and prepared for migration into the cloud. In one embodiment, the image is decoupled from its hardware resources using the capture process. The capture process prepares the image to enable it to be migrated across heterogeneous physical and virtual systems. One of the steps in this process is to be able to configure the image to be able to boot and run on multiple CPU platforms. Process 500 then migrates the host into the cloud where it is uploaded and resides as a cloud image (operation 507). Once the cloud image is running on the compute resources of the cloud, it is referred to as a cloud host. This completes process 500 according to one illustrative embodiment.

Figure 6:
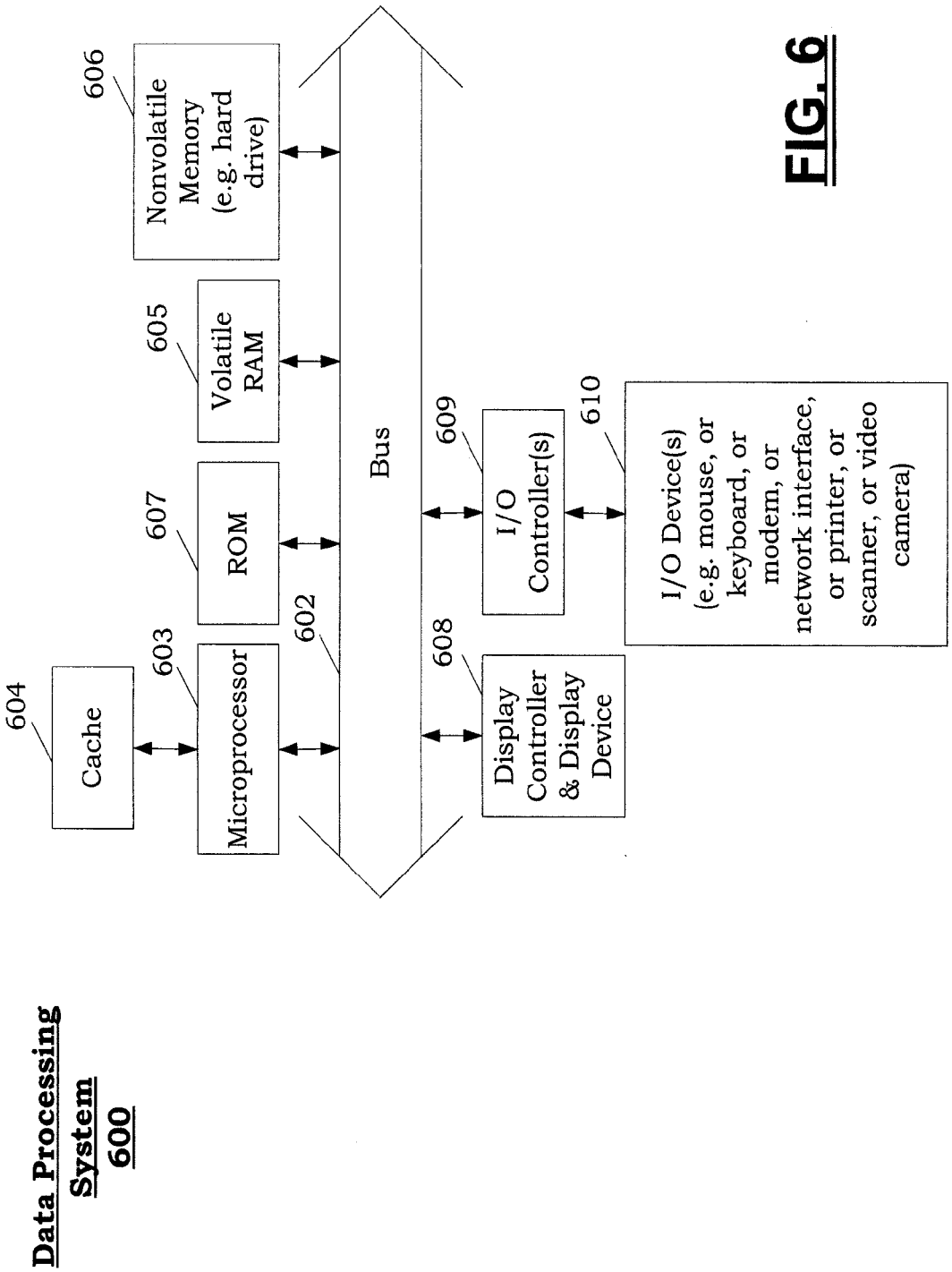
FIG. 6 depicts an illustrative data processing system upon which the methods and apparatuses of embodiments may be implemented.

FIG. 6 depicts an illustrative data processing system upon which the methods of various embodiments may be implemented. While FIG. 6 illustrates various components of a data processing system, it is not intended to represent any particular system or architecture thereof; or any manner of interconnecting the components, as such details are not germane to this description. It will be appreciated that network computers and other data processing systems, which have fewer components or more components may also be used. The data processing system of FIG. 6 may, for example, be a workstation, a personal computer (PC) running a MS Windows operating system, a Macintosh, or a mobile wireless device such as a smartphone or PDA, among others.

As shown in FIG. 6, data processing system 601 includes a system bus 602 which is coupled to a microprocessor 603, a read-only memory (ROM) 607, a volatile random access memory (RAM) 605, and other non-volatile memory 606 (such as electronic or magnetic disk storage). The microprocessor 603, which may be any processor designed to execute an instruction set, is coupled to cache memory 604 as shown. The system bus 602 interconnects these various components together and may also interconnect components 603, 607, 605, and 606 to a display controller and display device 608, and to peripheral devices such as I/O devices 610, keyboards, modems, network interfaces, printers, scanners, video cameras, and other devices which are well known in the art. Generally, I/O devices 610 are coupled to the system bus 602 through an I/O controller 609. Volatile RAM 605 can be implemented as dynamic RAM ("DRAM"), which requires power continually in order to refresh or maintain the data in the memory or any other type of volatile RAM. The non-volatile memory 606 can any type of memory system that maintains data after power is removed from the system.

While FIG. 6 shows that the non-volatile memory 606 is a local device coupled directly to the components of the data processing system, it will be appreciated that this description is not so limited and may utilize a non-volatile memory remote from the system, such as a network storage device coupled to the data processing system 600 through a wired or wireless network. The system bus 602 may further include one or more buses connected to each other through various bridges, controllers or adapters (not shown) as is well known in the art. Additionally, it will be understood that the various embodiments described herein may be implemented with data processing systems which have more or fewer components than system 600.

The data processing systems described herein may be specially constructed for specific purposes, or they may comprise general purpose computers selectively activated or configured by a computer program stored in the computer's memory. Such a computer program may be stored in a computer-readable medium. A computer-readable medium can be used to store software instructions, which when executed by the data processing system, causes the system to perform the various methods of this description. A computer-readable medium may include any mechanism that provides information in a form accessible by a machine (e.g., a computer, network device, PDA, or any device having a set of one or more processors). For example, a computer-readable medium may include any type of disk including floppy disks, hard drive disks (HDDs), solid-state devices (SSDs), optical disks, CD-ROMs, and magnetic-optical disks, ROMs, RAMs, EPROMs, EEPROMs, other flash memory, magnetic or optical cards; or any type of media suitable for storing instructions in an electronic format.

Throughout the foregoing description, and for the purposes of explanation, numerous specific details were set forth in order to provide a thorough understanding of the disclosed embodiments. It will be apparent to one skilled in the art, however, that various embodiments may be practiced without some of these specific details. Although embodiments which incorporate the techniques in this description have been shown and described in detail herein, those skilled in the art can readily devise many other varied embodiments that still incorporate these techniques. Embodiments of the invention may include various operations as set forth above or fewer operations or more operations, as well as operations in an order. Accordingly, the scope and spirit of the invention should be judged in terms of the claims which follow as well as the legal equivalents thereof.

What is claimed is:

1. A method of bridging computing resources in a cloud computing network, the method comprising:
   discovering a host running on a first set of computing resources in the cloud computing network;
   generating an image of the host that at least includes an operating system running on the host;
   decoupling the host image from the first set of computing resources; and
   migrating the host image to a second set of computing resources, the host image being placed in a container located on the second set of computing resources, the container comprising a plurality of images that interact to perform a particular computing task, wherein each image of the plurality of images is associated with a tier of a plurality of tiers of a multi-tiered enterprise model, and wherein users can access computing services and perform computing tasks associated with the host image on the second set of computing resources over the cloud computing network as if the computing services were installed locally on their own computer.

2. The method of claim 1, wherein the first set of computing resources are located in an enterprise and the second set of computing resources are located in a cloud.

3. The method of claim 2, wherein the host image is migrated across multiple clouds having disparate computing resources.

4. The method of claim 1, further comprising automatically configuring the host image for uploading into a cloud.

5. The method of claim 1, wherein the host image is generated by taking a snapshot of a set of computing tasks running on the host at a point in time.

6. The method of claim 1, wherein the host image comprises the host operating system and its application stack.

7. The method of claim 1, wherein the first set of computing resources are located on a first virtual machine in an enterprise and the second set of computing resources are located on a second dissimilar virtual machine in the enterprise.

8. The method of claim 7, wherein any one of the first and second set of computing resources is a bare metal server.

9. The method of claim 1, wherein the decoupling further comprises separating metadata bits of the computing tasks from data of the computing tasks.

10. The method of claim 1, further comprising:
monitoring usage levels of the host; and
performing autoscaling based on the usage levels.

11. The method of claim 10, wherein the autoscaling comprises:
generating at least one clone of the host when usage levels increase above a threshold; and
deactivating at least one clone when usage levels fall below the threshold.

12. The method of claim 11, wherein preference is given for a set of computing resources to be utilized first for cloning.

13. The method of claim 1, further comprising autoscaling for disaster recovery.

14. The method of claim 1, further comprising performing cloudbursting to match system load.

15. A remote management module for bridging computing resources in a cloud computing network comprising:
an operations module configured to:
discover a host running on a first set of computing resources in the cloud computing network;
generate an image of the host that at least includes an operating system running on the host;
decouple the host image from the first set of computing resources; and
migrate the host image to a second set of computing resources, the host image being placed in a container located on the second set of computing resources, the container comprising a plurality of images that interact to perform a particular computing task, the container being associated with at least one policy, wherein users can access computing services and perform computing tasks associated with the host image on the second set of computing resources over the cloud computing network as if the computing services were installed locally on their own computer;
wherein the operations module comprises one or more of hardware and executable code, the executable code stored on one or more computer readable storage media.

16. The remote management module of claim 15, wherein the first set of computing resources are located in an enterprise and the second set of computing resources are located in a cloud.

17. The remote management module of claim 16, wherein the host image is migrated across multiple clouds having disparate computing resources.

18. The remote management module of claim 15, wherein the operations module is further adapted to automatically configure the host image for uploading into a cloud.

19. The remote management module of claim 15, wherein the host image is generated by taking a snapshot of a set of computing tasks running on the host at a point in time.

20. The remote management module of claim 15, wherein the host image comprises the host operating system and its application stack.

21. The remote management module of claim 15, wherein the first set of computing resources are located on a first virtual machine in an enterprise and the second set of computing resources are located on a second dissimilar virtual machine in the enterprise.

22. The remote management module of claim 21, wherein any one of the first and second set of computing resources is a bare metal server.

23. The remote management module of claim 15, wherein the operations module is further adapted to perform decoupling by separating metadata bits of the computing tasks from data of the computing tasks.

24. The remote management module of claim 23, further comprising a monitoring module configured to observe usage levels of the host and initiate autoscaling based on the usage levels.

25. The remote management module of claim 24, wherein the autoscaling comprises:
generating at least one clone of the host when usage levels increase above a threshold; and
deactivating at least one clone when usage levels fall below the threshold.

26. The remote management module of claim 15, further comprising a disaster recovery component configured to clone hosts for disaster recovery.

27. The remote management module of claim 15, further comprising a cloudbursting component configured to perform autoscaling to match system load.

* * * * *

UNITED STATES PATENT AND TRADEMARK OFFICE
CERTIFICATE OF CORRECTION

PATENT NO. : 8,909,767 B2  
APPLICATION NO. : 13/272619  
DATED : December 9, 2014  
INVENTOR(S) : Sunkara et al.

Page 1 of 1

It is certified that error appears in the above-identified patent and that said Letters Patent is hereby corrected as shown below:

Title page

Item 75, Inventors, Should read

Sash Sunkara, Dublin, CA (US); Todd Matters, Royersford, PA (US); Michael Brooks, Spring City, PA (US); Chris Barry, Philadelphia, PA (US); Jason Smith, Collegeville, PA (US); Aniket Kulkarni, Santa Clara, CA (US)

Signed and Sealed this
Twenty-fifth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,909,767 B2 | |
| APPLICATION NO. | : 13/272619 | |
| DATED | : December 9, 2014 | |
| INVENTOR(S) | : Sunkara et al. | |

It is certified that error appears in the above-identified patent and that said Letters Patent is hereby corrected as shown below:

Title page

Item 75, Inventors, Should read

Sash Sunkara, Dublin, CA (US); Todd Matters, Royersford, PA (US); Michael Brooks, Spring City, PA (US); Chris Barry, Philadelphia, PA (US); Jason Smith, Collegeville, PA (US); Aniket Kulkarni, Pune (IN)

This certificate supersedes the Certificate of Correction issued August 25, 2015.

Signed and Sealed this
Twenty-ninth Day of September, 2015

Michelle K. Lee
*Director of the United States Patent and Trademark Office*